(12) United States Patent
Thompson et al.

(10) Patent No.: US 7,528,613 B1
(45) Date of Patent: May 5, 2009

(54) APPARATUS AND METHOD FOR STEERING RF SCANS PROVIDED BY AN AIRCRAFT RADAR ANTENNA

(75) Inventors: Chris L. Thompson, Robins, IA (US); Bo S. Hagen, Marion, IA (US); Mark V. McPeek, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 11/478,817

(22) Filed: Jun. 30, 2006

(51) Int. Cl.
*G01R 27/04* (2006.01)
(52) U.S. Cl. ............... 324/637; 324/72; 324/76.56
(58) Field of Classification Search .................. 324/72, 324/642, 637; 342/26 B
See application file for complete search history.

(56) References Cited

U.S. PATENT DOCUMENTS

| | | | | |
|---|---|---|---|---|
| 3,033,084 | A | * | 5/1962 | Wheeler et al. ............ 235/401 |
| 3,517,389 | A | * | 6/1970 | Dausin ....................... 342/371 |
| 3,611,367 | A | * | 10/1971 | Billottet et al. .............. 342/58 |
| 3,935,572 | A | * | 1/1976 | Broniwitz et al. ............ 342/80 |
| 4,249,174 | A | | 2/1981 | Lucchi et al. |
| 4,749,995 | A | * | 6/1988 | Hopwood et al. ........... 342/371 |
| 4,901,080 | A | * | 2/1990 | McHenry ...................... 342/1 |
| 4,940,987 | A | * | 7/1990 | Frederick ................. 342/26 D |
| 4,996,473 | A | * | 2/1991 | Markson et al. .............. 324/72 |
| 5,835,062 | A | * | 11/1998 | Heckaman et al. ..... 343/700 MS |
| 6,081,235 | A | * | 6/2000 | Romanofsky et al. . 343/700 MS |
| 6,166,661 | A | | 12/2000 | Anderson et al. |
| 6,191,754 | B1 | * | 2/2001 | Nathanson et al. .......... 343/876 |
| 6,198,437 | B1 | * | 3/2001 | Watson et al. ......... 343/700 MS |
| 6,201,494 | B1 | * | 3/2001 | Kronfeld ................. 342/26 R |
| 6,246,369 | B1 | * | 6/2001 | Brown et al. .......... 343/700 MS |
| 6,281,832 | B1 | | 8/2001 | McElreath |
| 6,388,607 | B1 | | 5/2002 | Woodell |
| 6,424,288 | B1 | | 7/2002 | Woodell |
| 6,441,773 | B1 | | 8/2002 | Kelly et al. |
| 6,441,787 | B1 | * | 8/2002 | Richards et al. ....... 343/700 MS |
| 6,512,476 | B1 | | 1/2003 | Woodell |
| 6,549,161 | B1 | * | 4/2003 | Woodell ................... 342/26 R |
| 6,642,889 | B1 | * | 11/2003 | McGrath ............. 343/700 MS |
| 6,650,275 | B1 | | 11/2003 | Kelly et al. |
| 6,741,203 | B1 | | 5/2004 | Woodell |
| 6,741,208 | B1 | | 5/2004 | West et al. |
| 6,744,408 | B1 | | 6/2004 | Stockmaster |
| 6,806,846 | B1 | * | 10/2004 | West ......................... 343/909 |
| 6,850,185 | B1 | | 2/2005 | Woodell |
| 6,879,280 | B1 | | 4/2005 | Bull et al. |
| 6,882,302 | B1 | | 4/2005 | Woodell et al. |
| 7,042,397 | B2 | * | 5/2006 | Charrier et al. ....... 343/700 MS |
| 7,420,504 | B1 | * | 9/2008 | Held et al. ................. 342/137 |
| 2006/0139224 | A1 | * | 6/2006 | Tietjen ....................... 343/757 |

OTHER PUBLICATIONS

Pozar, David M. Microwave Engineering, John Wiley & Sons, Inc., 1998, pp. 120-129.*

* cited by examiner

*Primary Examiner*—Vincent Q. Nguyen
*Assistant Examiner*—Thomas F. Valone

(57) ABSTRACT

A radar system is disclosed. The radar system comprises an antenna mounting apparatus coupled to the aircraft, and an antenna rotatably coupled to the mounting apparatus. The antenna is configured to rotationally orientate for an azimuth scan and electronically orientate for a tilt scan.

19 Claims, 6 Drawing Sheets

US 7,528,613 B1

APPARATUS AND METHOD FOR STEERING RF SCANS PROVIDED BY AN AIRCRAFT RADAR ANTENNA

BACKGROUND

The present invention relates to an antenna for a radar system. More specifically, the present invention relates to an antenna for an aircraft weather radar system that scans a first direction by rotating about one axis and scans a second direction by electronically steering the radio frequency (RF) beam.

It is generally known to provide for an antenna for an aircraft weather radar. Such known antennas typically include a mounting apparatus and an antenna coupled to the mounting apparatus by an elongated structure. Typical radar scanning antennas utilize mechanical scanning, relying on motor and gear arrangements to physically rotate and tilt (elevate) the antenna. FIGS. 8 and 9 illustrate an exemplary known aircraft weather radar system 100. Radar system 100 includes an antenna 102 and a mounting apparatus 104. The mounting apparatus 104 includes a base 103 and a support arm 106 extending from the base 103 and configured to support, among other components, the antenna 102, a horizontal drive motor 105, and a vertical drive motor 107. Mechanically scanning both the vertical axis (azimuth) 108 and the horizontal axis (tilt) 109 requires the horizontal drive motor 105 and the vertical drive motor 107 to be mounted close to the pivot axes 108, 109 of the antenna 102 (for mechanical antennas this is close to the center of the flatplate), and requires the mounting apparatus 104 to be in the rotation area of the antenna 102. This generally limits the effective scan angle to 180 degrees or less.

However, such known radar systems have several disadvantages including having limited scan angles, being heavier, occupying more space than desired, and being susceptible to shock and mechanical failure, excess RF power generation to compensate for transmission losses to the moving antenna element through rotary couplings. Also, mechanical scan (azimuth and tilt) antennas have single point failure components, such as motors, bearings, gears, RF switches, and moving interconnects that are susceptible to mechanical breakdown and wear causing undesirable stranding rates. Further, motor sizes to compensate for vibration, acceleration, and deceleration are larger and dissipate more power than desired. In addition to these "mechanized" disadvantages, radome volume and weight reduction is becoming more and more important for aircraft manufacturers in order to increase cargo capacity and passenger comfort. Furthermore, aircraft manufacturers desire better hazard detection capabilities (e.g., turbulence, lightning, windshear, hail, severe weather, etc.) to reduce potentials for aircraft damage and passenger discomfort.

Accordingly, it would be advantageous to provide a radar system that rotates only about one axis. It would also be advantageous to provide a radar system that is lighter, is less susceptible to vibrations, and has fewer components susceptible to failure. It would further be advantageous to provide a radar system with the possibility of an azimuthal scan greater than 180 degrees. It would be desirable to provide for an antenna having one or more of these or other advantageous features. To provide a reliable, and widely adaptable, antenna that avoids the above-referenced and other problems would represent a significant advance in the art.

SUMMARY

The present invention relates to a radar system for an aircraft. The radar system comprises an antenna mounting apparatus coupled to the aircraft, and an antenna rotatably coupled to the mounting apparatus. The antenna is configured to rotationally orientate for an azimuth scan and electronically orientate for a tilt scan.

The present invention also relates to a radar system for an aircraft. The radar system comprises an antenna mounting apparatus coupled to the aircraft and comprising a base, a first member extending from the base and a second member extending from the base and spaced apart from the first member. The radar system further comprises an antenna coupled to the antenna mounting apparatus between the first member and the second member, and configured to rotate about a first axis. The antenna scans a first direction by rotating about the axis and scans a second direction by electronically steering the radio frequency (RF) beam about a second axis.

The present invention further relates to a method of scanning a space with a radar system having a transmitter. The method comprises performing a first radar scan of a first orientation by rotating the transmitter about a single axis, and performing a second radar scan of a second orientation by electronically steering the radio frequency (RF) beam.

The present invention further relates to a radar system for an aircraft comprising a mounting structure mechanically coupled to the aircraft; and an antenna mechanically coupled to the mounting structure at least two distinct points. The antenna is capable of mechanically scanning about a first axis and capable of electronically scanning about a second axis, the second axis being different than the first axis.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

DETAILED DESCRIPTION OF PREFERRED AND EXEMPLARY EMBODIMENTS

Figure 1:
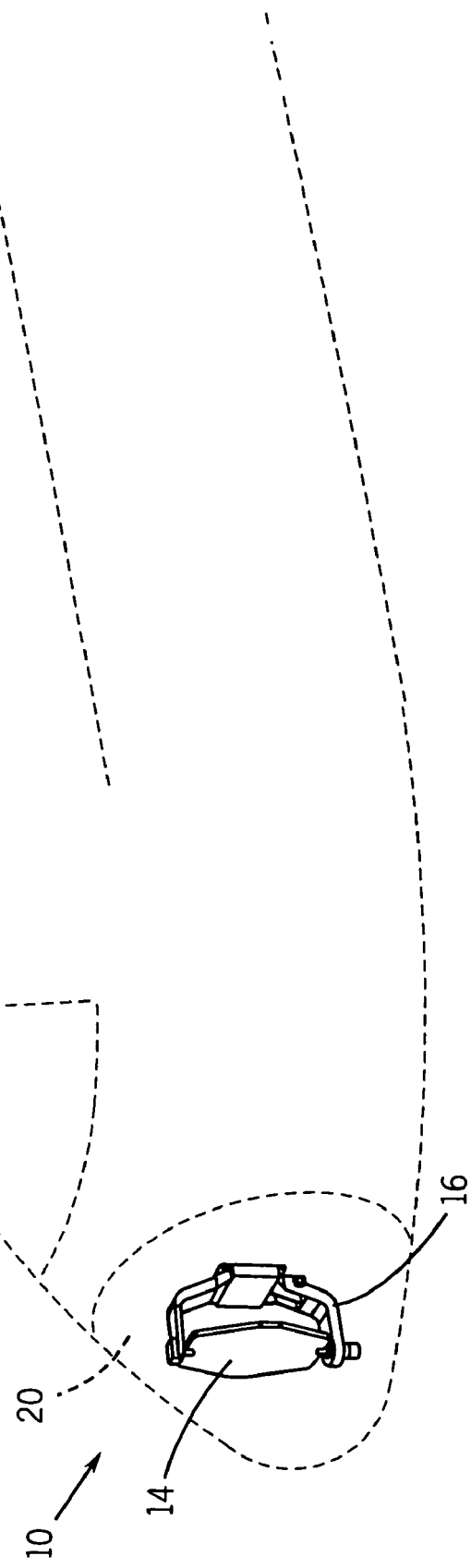
FIG. 1 is a perspective fragmentary view of an aircraft with a radar system.
Figure 2:
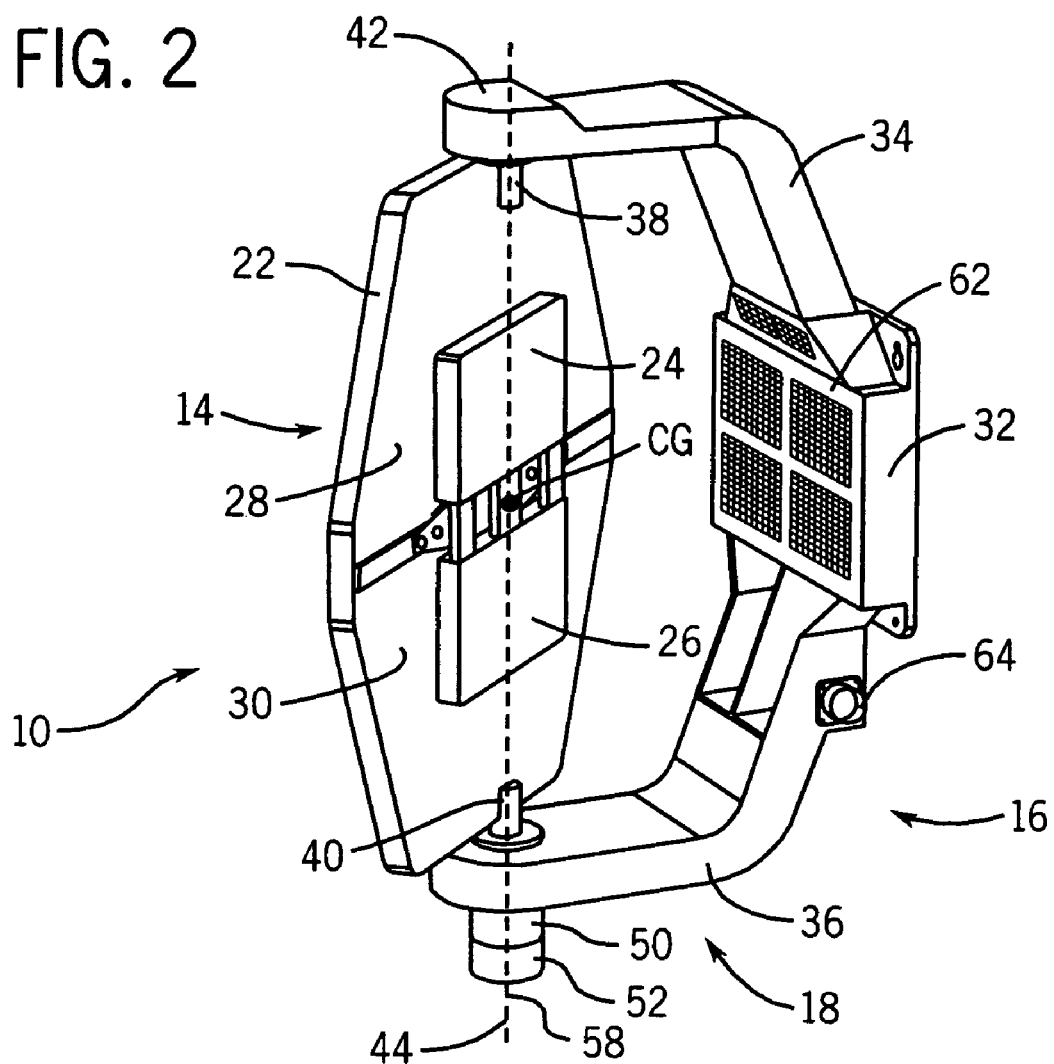
FIG. 2 is a perspective view of a radar system according to an exemplary embodiment.

FIG. 1 shows a radar system 10 mounted on a forward or front portion (nose) of an aircraft 12. Radar system 10 may be any of a variety of detection systems, including weather, wind shear, turbulence, micro-bursts, airborne obstacles, lightning, hail, ground (e.g., runway) obstacles or the like or combinations thereof. Configuration, arrangement, and operation of radar system 10 are intended to reduce or minimize the required space and weight, improve performance, expand functionality, and reduce potential failure, malfunction, or normal wear of the radar system.

Radar system 10 includes, among other components, an antenna 14, an antenna mounting apparatus 16, and a control system 18. Radar system 10 also include a user interface, including a display, keyboard/buttons, for the user or pilot to view the radar information or exert control over its operation. A shell 20 (generally referred to as a "radome") encloses antenna 14 and mounting apparatus 16.

Antenna 14 is configured to transmit and receive radar signals under the control of control system 18. Antenna 14 includes a panel 22, transmitter/receiver module 24 coupled to panel 22, a second (e.g., redundant) transmitter/receiver module 26 coupled to panel 22, and an electronic module 28, and a second (e.g., redundant) electronic module 30. Panel 22 (which is also generally referred to as a flat plate radiator) includes a first side that functions as a mechanical waveguide array and includes a plurality of wave guide channels (or grooves, apertures, or other structure) to form and emit the RF energy (i.e. beam or beams). According to a particular embodiment, panel 22 is a 28 inches high×24 inches wide octagonal flatplate which provides a reduction in volume greater than 30 percent (%) compared to a 28 inch flatplate. Electronic modules 28, 30 are coupled to a second side of panel 22, opposite of the first side, and are configured for signal processing, input/output, electronic scan control, power distribution, and the like. Transmitter/receiver modules 24, 26 are also coupled to the second side of panel 22. Locating modules 24, 26 on panel 22 is intended to eliminate the rotary joint with its transmission loss, eliminate the need for a waveguide switch and radio frequency feed tube, improves reliability and dispatchability, reduces weight, lower radio frequency losses, reduce power requirements on the radio frequency module, reduces overall systems power requirements and associated weight.

Antenna mounting apparatus 16 (e.g., base, pedestal, yoke, frame, fixture, bracket, structure, etc.) is configured to provide structural support to antenna 14 and may provide structural support to other components of radar system 10. Mounting apparatus 16 includes a base 32, an upper arm 34, and a lower arm 36. Base 32 is coupled to a forward bulkhead of aircraft 12. Upper arm 34 (e.g., support member, beam, portion, etc.) extends from base 32 and include a first end coupled to base 32 and a second end coupled to a top portion of antenna 14 by a shaft 38 (e.g., axle, rod, pin, etc.). Lower arm 36 (e.g., support member, beam, portion, etc.) extends from base 32 and include a first end coupled to base 32 and a second end coupled to a bottom portion antenna 14 by a shaft 40 (e.g., axle, rod, pin, etc.). As such, only two wide spaced bearings may be needed to support the radial loads, and are generally not subject to angular misalignment due to shaft deflections. According to an exemplary embodiment, a lightning sensor 42 is coupled to upper arm 34.

The coupling and rotation of antenna 14 about shafts 38, 40 defines location, alignment, and orientation of a single axis 44. According to an exemplary embodiment, antenna 14 rotates about axis 44 to provide one degree of freedom of "physical" or "mechanical" motion. Antenna 14 scans a first direction by "physically" or "mechanically" rotating about axis 44, and scans a second direction by electronically steering the RF beam. Such electronic orientation of antenna 14 eliminates a motor and gear train for this radar in the elevation direction, which improves reliability and dispatchability, reduces weight since structure approximates a broad parallelogram instead of the mechanical drive system that is more like a mechanical beam. According to a preferred embodiment, axis 44 is a generally or substantially vertical axis so that antenna 14 rotates to provide an azimuth scan (e.g., horizontal or across the horizon) and electronically steers the RF beam to provide a tilt scan (e.g., vertical). According to a particularly preferred embodiment, axis 44 and extends through the center of gravity (CG) of antenna 14 so that antenna 14 is balanced relative to its axis 44 of rotation. Alternatively, the axis of rotation of the antenna may be horizontal or any of a variety of orientations. According to an exemplary embodiment, antenna 14 is configured to rotate 360 degrees. According to a preferred embodiment, antenna 14 is configured to continuously rotate beyond 360 degrees (i.e., not merely to rotate plus or minus (+/−) 180 degrees). According to alternative embodiments, the antenna may be configured to rotate at any of a variety of degrees. Since antenna 14 does not need to rotate in the horizontal axis, mounting apparatus 16 can be modified to allow for a 360 degree mechanical rotation of antenna 14, which enables a wider scan angle which is only limited by the forward bulkhead design and antenna 14 location.

Control system 18 is configured to control the operation and movement of antenna 14. Control system 18 includes a motor 50, a second (redundant) motor 52, antenna control electronics 54, and second (redundant) antenna control electronics 56. According to an exemplary embodiment, motor 50 is a direct drive motor coupled to lower arm 36 and configured to rotate antenna 14 by rotating shaft 40. Second motor 52 is configured to provide rotational drive to antenna 14 by rotating shaft 40 (or shaft 38 if mounted to upper arm 34) upon malfunction or failure of motor 50. Alternatively, motor 50 and motor 52 alternate driving antenna 14, or simultaneously drive antenna 14, or the like. According to a preferred embodiment, motor 50 (and motor 52) provide a torque or rotational force with an axis of rotation 58 that is co-axial with axis 44. According to a particularly preferred embodiment, axis 58 also extends through the center of gravity (CG) so that motor 50, as well as antenna 14, is balanced relative to its axis 50 of rotation without the implementation of counterweights. Such a balanced design is intended to reduce the required support structure, improve vibration efficiency, improve pointing accuracy, and the like.

The axis of rotation may be changed to achieve balance even if the antenna structure grows in depth. This can allow dual systems with either limited or full redundancy to be implemented with the efficiency of the balanced design. According to an exemplary embodiment, motor 50 rotates shaft 40 without mechanical advantage (e.g., gears) because of the balanced design. Since the antenna panel 14 is balanced both horizontally and vertically, a smaller/lower powered motor(s) can be used for a given vibration capability. A smaller motor size are lighter and reduces overall systems power requirements (i.e., reduced power supply weight).

According to an exemplary embodiment, antenna control electronics 54, 56 are located in one or more recesses 60 (e.g., pockets, zones, etc.) in base 32 of mounting apparatus 16 and covered by a cover 62. Cover 62 includes ventilation holes to provide ventilation and cool electronics 54, 56. Antenna control electronics 54, 56 are in communication with antenna 14 (e.g., wiring and/or fiber optic) through upper arm 34 and/or lower arm 36 and through respective rotating joints. According to an exemplary embodiment, the rotary joint(s) provide an optimized location for dual fiber optic rotary data interfaces and a dual slip ring, or magnetic rotary power interface along the center of azimuth rotation, which improves reliability and dispatchability. Antenna control electronics 54, 56 are in communication with other components of radar system 10 or aircraft 12 through an interface 64 (e.g., plug-in) for data and/or power. A second interface (not shown) may be provided on the opposite side of base from interface 64 for second electronics 56.

Figure 3:
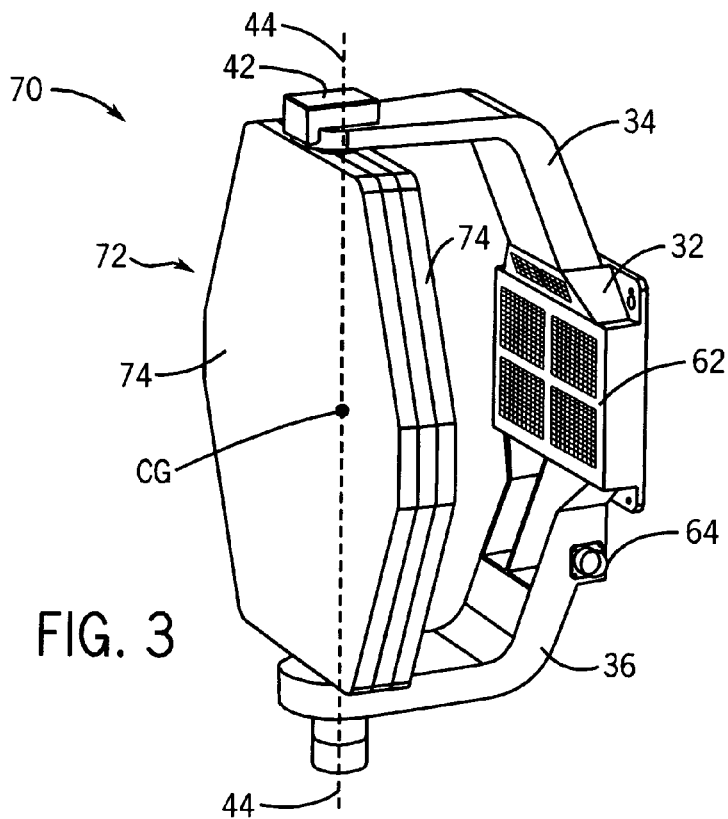
FIG. 3 is a perspective view of a radar system according to another exemplary embodiment.
Figure 4:
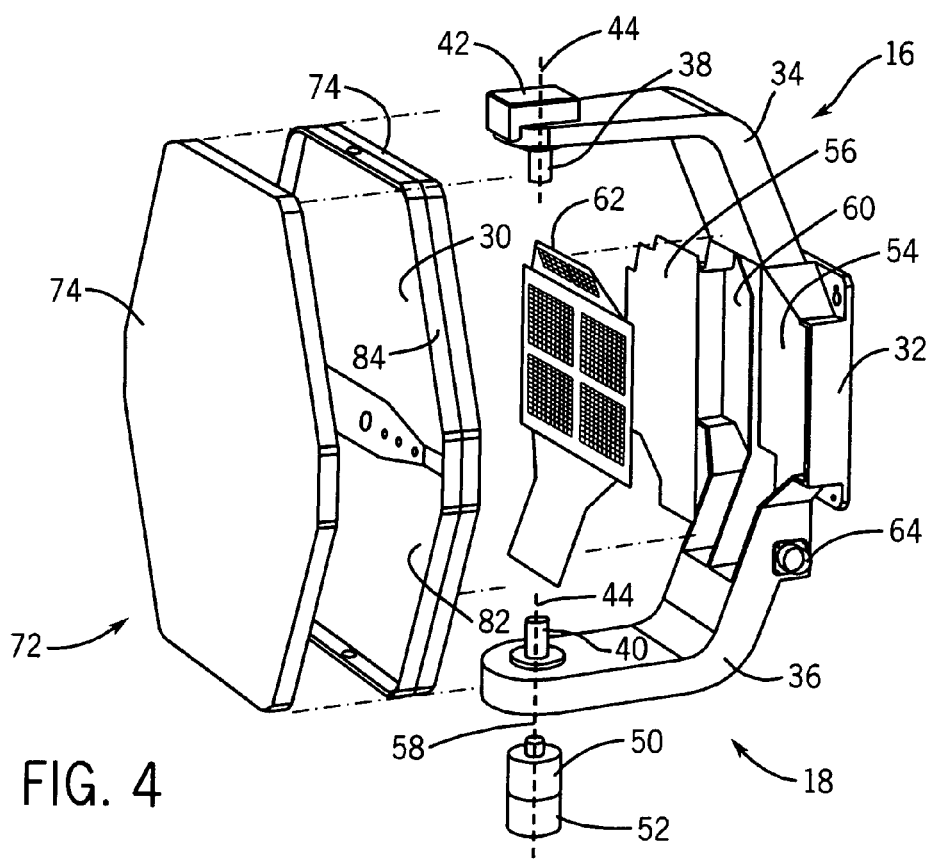
FIG. 4 is an exploded view of the radar system of FIG. 3.

FIG. 3 is a perspective view of a radar system 70 according to another exemplary embodiment. FIG. 4 is an exploded view of the radar system of FIG. 3. Radar system 70 is similar to radar system 10, except that it comprises an antenna 72 having two panels 74, a transmitter/receiver module (not shown) coupled to each panel 74, a second (e.g., redundant) transmitter/receiver module (not shown) coupled to each panel 74, and an electronic module 80 coupled to each panel 74, and a second (e.g., redundant) electronic module 82 coupled to each panel 74. Panels 74, transmitter/receiver modules, and electronic modules 80, 82 are similar to the comparable components of antenna 14. Panels 74 is spaced apart from each other by a spacer member 84. Ventilation holes allow air circulation between panels to cool the electronics and other components. According to a preferred embodiment, panels 74 are positioned as close to each other as possible to minimize space required to rotate antenna 72 and to minimize the moment force applied to shafts 38, 40 and arms 34, 36. Redundant system allows one panel to fail without loosing the weather radar function. System 70 is intended to improve reliability and dispatchability and allow the inclusion of a weather function on one side while the other side could be used for an independent system utilizing millimeter-wave or other technologies, and provide an integrity improvement by using two independent similar radar systems. The radar system can be configured as a single, dual, or combination single/dual system.

Figure 5:
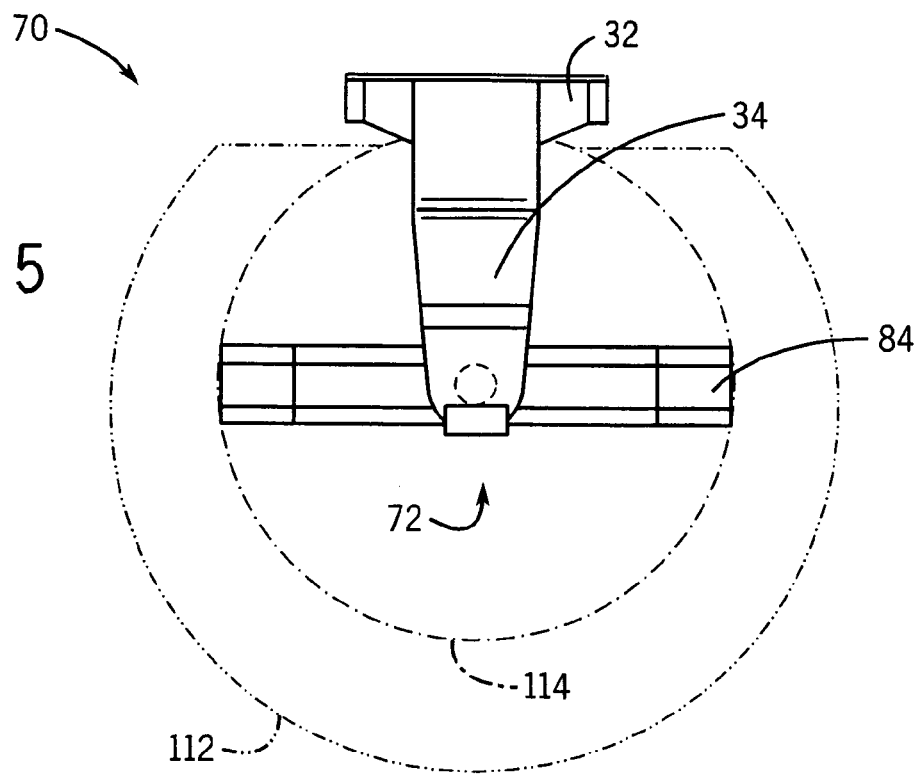
FIG. 5 is a top plan view of an antenna and mounting apparatus of FIG. 3.
Figure 6:
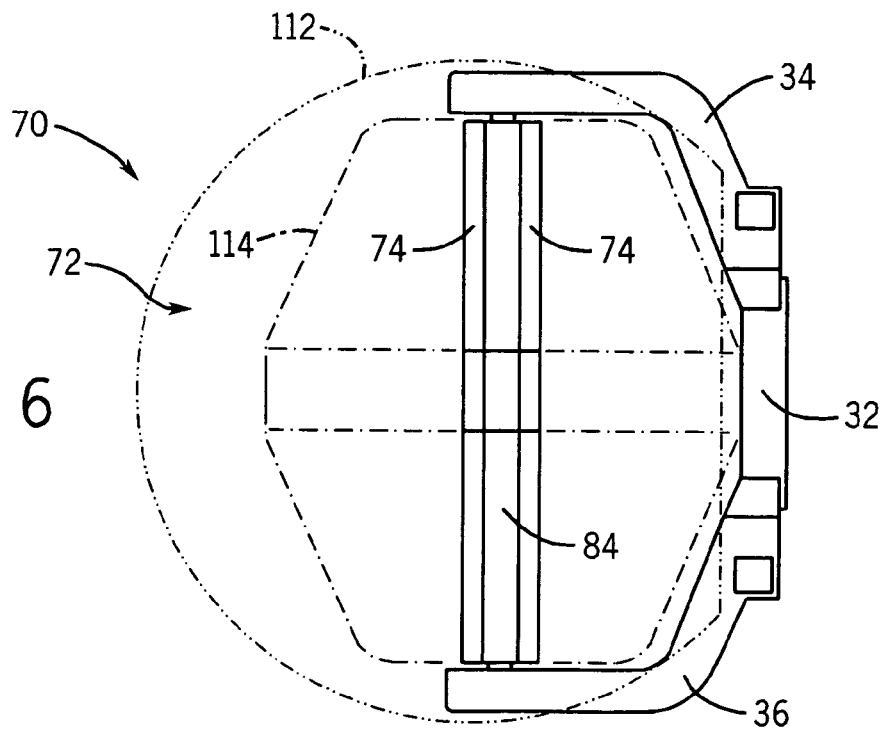
FIG. 6 is a side elevation view of the antenna and mounting apparatus of FIG. 3.
Figure 7A:
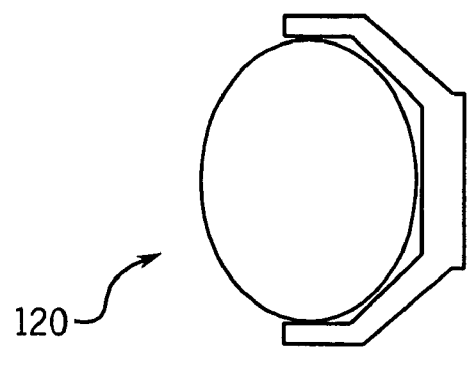
FIG. 7 is a side view of a variety of exemplary embodiments.
Figure 7B:
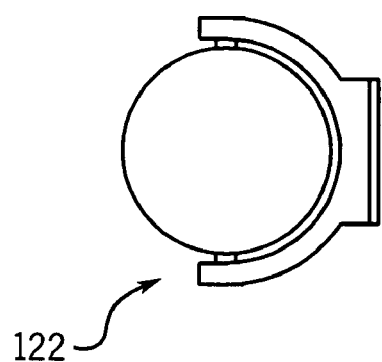
Figure 7C:
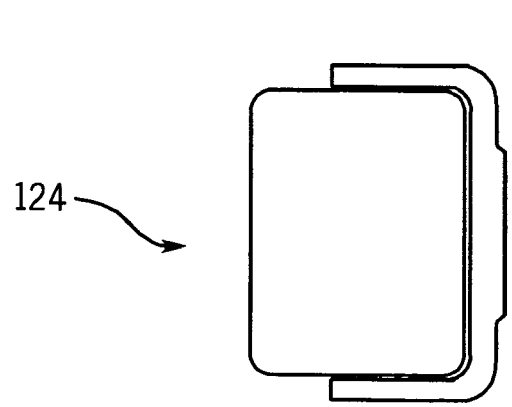
Figure 7D:
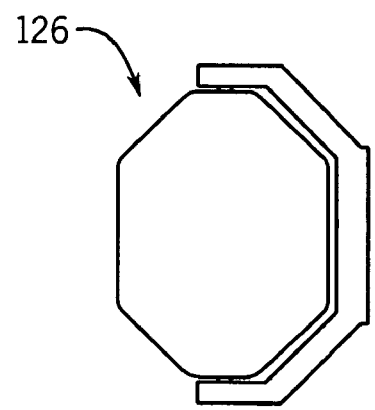
Figure 8:
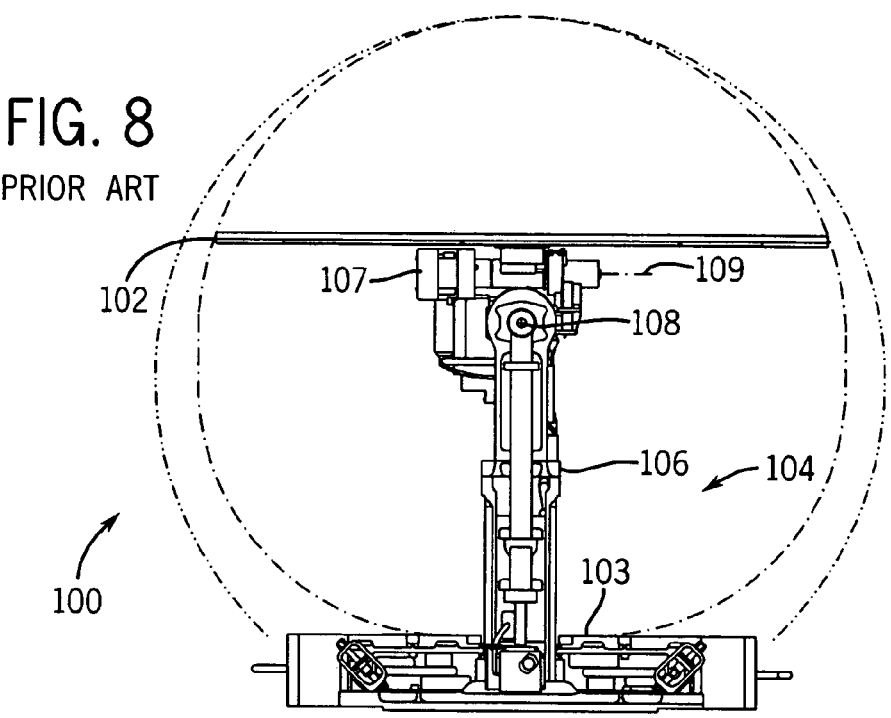
FIG. 8 is a top plan view of a known antenna and mounting apparatus.
Figure 9:
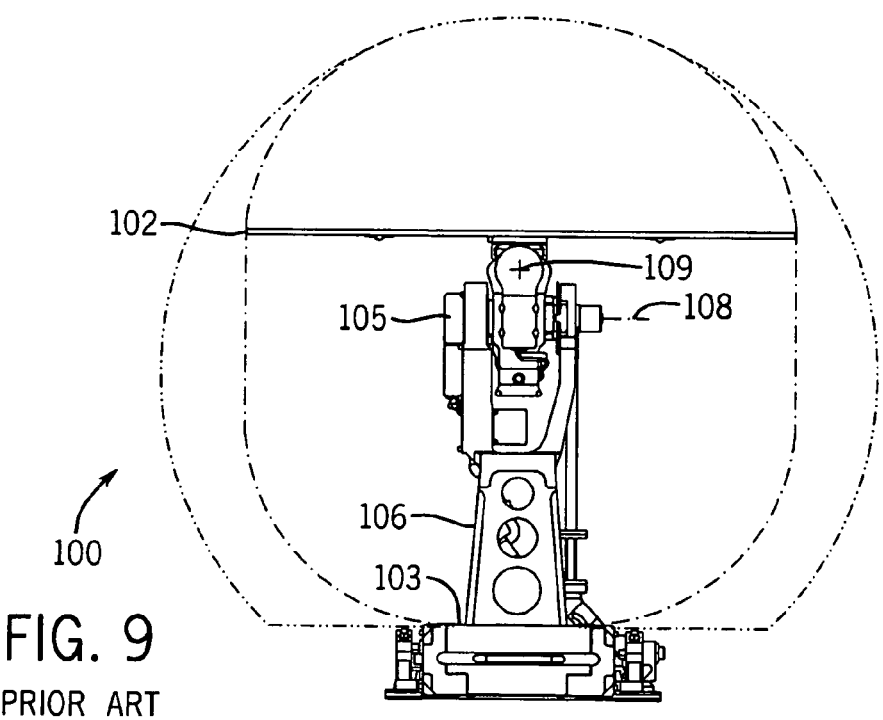
FIG. 9 is a side elevation view of the antenna and mounting apparatus of FIG. 8.

FIG. 8 is a top plan view of antenna 102 and antenna mounting apparatus 104 of known radar system 100, and FIG. 9 is a side elevation view of the antenna and mounting apparatus of FIG. 8. Antenna 102 is physically or mechanically rotated in both the azimuth direction and the tilt direction. To provide 180 degree scan angle, antenna 102 is mounted on an end of a support arm 106 so that antenna 102 can be rotated 180 degrees (+90 degrees and −90 degrees as shown in FIG. 8) about a vertical axis 108 (to provide azimuth scan) and rotated 90 degrees (plus or minus (+/−) 45 degrees) about a horizontal axis (to provide a tilt scan). The volume or space required to accommodate such rotation is generally identified by a broken line with a reference numeral 110 in FIGS. 8 and 9. Broken line 112 represents the current industry standard for allowable volume for a nose-mounted weather radar system. The volume or space required for rotation of radar system 70 (and radar system 10) is generally identified by a broken line with a reference numeral 114 in FIGS. 5 and 6. Comparison of FIGS. 5 and 6 with FIGS. 8 and 9 illustrates the less amount of volume required to operate radar systems 10 or 70 than the known radar system 100.

FIG. 7 is a side view of a variety of exemplary embodiments, illustrating an elliptical/ovular shaped antenna 120, circular shaped antenna 122, rectangular shaped antenna 124, and octagonal shaped antenna 126. According to alternative embodiments, the shape of antenna (or panels of antenna) may be any of a variety of sizes and shapes (e.g., square shaped, semi-circular shaped, any of a variety of polygonal or arcuate shapes, etc.). The mounting apparatus may be shaped to conform to the shape of the antenna (i.e., to that there is no interference when antenna rotates) or have any of a variety of other shapes to increase structural integrity and/or reduce weight or space taken by the radar system (particularly the mounting apparatus and antenna).

While the components of the disclosed embodiments will be illustrated as an antenna and mounting arrangement designed for a weather radar, the features of the disclosed embodiments have a much wider applicability. For example, the antenna and mounting arrangement design is adaptable for other radar systems for aircraft or vehicles where it is desirable to minimize space, and provide a broad range of scan on a stable platform.

Further, it is important to note that the terms "antenna" and "mounting apparatus" are intended to be broad terms and not terms of limitation. These components may be used with any of a variety of products or arrangements and are not intended to be limited to use with weather radar applications. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical or electrical relationship between the two components.

It is also important to note that the construction and arrangement of the elements of the mounting apparatus as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A radar system for an aircraft, the radar system comprising:
   an antenna mounting apparatus coupled to the aircraft;
   an antenna coupled to the mounting apparatus and configured to rotationally orientate for an azimuth scan and to electronically steer a radio frequency (RF) beam for a tilt scan;

wherein the mounting apparatus comprises an upper arm and a lower arm, wherein the antenna is rotatably coupled to the upper arm and the lower arm;

wherein the antenna comprises a first antenna panel, a second antenna panel, a first radar transmitter in communication with the first antenna panel, a first radar receiver in communication with the first antenna panel, a second radar transmitter in communication with the second antenna panel, and a second radar receiver in communication with the second antenna panel;

wherein the first radar transmitter and the second radar transmitter are located between the first antenna panel and the second antenna panel;

wherein the first antenna panel and the first radar transmitter are configured to perform a first radar scan by physically rotating the first antenna panel and the first radar transmitter about a single vertical axis;

wherein the first antenna panel and the first radar transmitter are further configured to perform a second radar scan by electronically steering the RF beam without the use of a motor and/or gear train; and wherein the second antenna panel and the second radar transmitter are configured to perform a third radar scan, wherein the first antenna panel and the second antenna panel are physically coupled and oppositely located, wherein the physical rotation of the first antenna panel and the first radar transmitter about the single vertical axis also rotates the second antenna panel and the second radar transmitter.

2. The radar system of claim 1 wherein the single vertical axis of rotation extends through the center of gravity of the antenna.

3. The radar system of claim 1 further comprising at least one motor configured to rotate the antenna about the single vertical axis, wherein the at least one motor is mounted on a base and provides an axis of rotation that is coaxial with the single vertical axis of rotation of the antenna.

4. The radar system of claim 1 further comprising a lightning sensor mounted on the upper or lower arm.

5. The radar system of claim 1 wherein the first antenna panel and the second antenna panel are one of circular-shaped, rectangular-shaped, square-shaped, elliptical-shaped, octagonal-shaped and ovular-shaped.

6. The radar system of claim 1 wherein the second antenna panel and the second radar transmitter are configured to operate if the first antenna panel or the first radar transmitter malfunction.

7. A radar system for an aircraft, the radar system comprising:
an antenna mounting apparatus coupled to the aircraft and comprising a base, a first member extending from the base and a second member extending from the base and spaced apart from the first member;
an antenna coupled to the antenna mounting apparatus between the first member and the second member, and configured to rotate about a vertical axis;
wherein the antenna comprises a first antenna panel, a second antenna panel, a first radar transmitter in communication with the first antenna panel, a first radar receiver in communication with the first panel, a second radar transmitter in communication with the second antenna panel, and a second radar receiver in communication with the second antenna panel, and wherein the first radar transmitter and the second radar transmitter are located between the first antenna panel and the second antenna panel;

wherein the first antenna panel and the first radar transmitter are configured to perform a first radar scan by physically rotating the first antenna panel and the first radar transmitter about the vertical axis;

wherein the first antenna panel and the first radar transmitter are further configured to perform a second radar scan by steering the RF beam with electronics and without the use of a motor and/or gear train; and wherein the second antenna panel and the second radar transmitter are configured to perform a third radar scan, wherein the first antenna panel and the second antenna panel are physically coupled and oppositely located, wherein the physical rotation of the first antenna panel and the first radar transmitter about the vertical axis also rotates the second antenna panel and the second radar transmitter.

8. The radar system of claim 7 wherein the antenna rotates more than 180 degrees about the vertical axis.

9. The radar system of claim 8 wherein the antenna rotates 360 degrees, continual and/or reversing, about the vertical axis.

10. The radar system of claim 7 further comprising a power supply and an antenna controller coupled to the antenna mounting apparatus and in communication with the first radar transmitter and the second radar transmitter.

11. The radar system of claim 7 further comprising a radome configured to enclose the base and the antenna, wherein a space in the radome occupied by the base and the antenna is defined by the outer dimensions of the base and the rotation of the antenna about the vertical axis.

12. The radar system of claim 7 wherein the radar system weighs less than 40 pounds.

13. A method of scanning a space with a radar system having a first radar transmitter electronically coupled to a first antenna panel and a second radar transmitter electronically coupled to a second panel, the method comprising:
performing a first radar scan using a first antenna panel and the first radar transmitter by physically rotating the first antenna panel and the first radar transmitter about a single vertical axis;
performing a second radar scan using the first antenna panel and the first radar transmitter by steering the RF beam with electronics and without the use of a motor and/or gear train; and
performing a third radar scan using the second antenna panel and the second radar transmitter, the second antenna panel physically coupled to the first antenna panel and oppositely located, wherein the physical rotation of the first antenna panel and the first radar transmitter about a single vertical axis also rotates the second antenna panel and the second radar transmitter.

14. The method of claim 13 wherein rotating the first antenna panel and the first radar transmitter about the single axis comprises rotating the first antenna panel and the first radar transmitter about the axis by 360 degrees.

15. The method of claim 13 wherein rotating the first radar transmitter about the single axis comprises rotating the first antenna panel about a vertical axis extending through a center of gravity of the antenna.

16. The method of claim 13 further comprising detecting weather, windshear, turbulence, airborne obstacles, runway obstacles, lightning, hail inference, microbursts, or combinations thereof.

17. A radar system for an aircraft comprising:
a mounting structure mechanically coupled to the aircraft; and an antenna mechanically coupled to the mounting structure at least two distinct points, wherein the antenna comprises a first antenna panel, a second antenna panel, a first radar transmitter in communication with the first antenna panel, a first radar receiver in communication with the first panel, a second radar transmitter in communication with the second antenna panel, and a second radar receiver in communication with the second antenna panel, and wherein the first radar transmitter and the second radar transmitter are located between the first antenna panel and the second antenna panel;

wherein the first antenna panel and the first radar transmitter are configured to perform a first radar scan by physically rotating the first antenna panel and the first radar transmitter about a vertical axis;

wherein the first antenna panel and the first radar transmitter are further configured to perform a second radar scan by electronically steering the RF beam without the use of a motor and/or gear train; and wherein the second antenna panel and the second radar transmitter are configured to perform a third radar scan, wherein the first antenna panel and the second antenna panel are physically coupled and oppositely located, wherein the physical rotation of the first antenna panel and the first radar transmitter about the vertical axis also rotates the second antenna panel and the second radar transmitter.

18. The radar system of claim 17 wherein the antenna has a substantially hexagon shape.

19. The radar system of claim 17 wherein the two distinct points are disposed on the vertical axis.

* * * * *